US007811657B2

(12) United States Patent
Cherukuri et al.

(10) Patent No.: US 7,811,657 B2
(45) Date of Patent: Oct. 12, 2010

(54) LOW GLARE, HIGH PRINT GLOSS PRINTING PAPER

(75) Inventors: Suresh B. Cherukuri, Wisconsin Rapids, WI (US); Dean F. Benjamin, Amherst, WI (US); Bernard J. Berger, Wisconsin Rapids, WI (US)

(73) Assignee: New Page Wisconsin System Inc., Miamisburg, OH (US)

( * ) Notice: Subject to any disclaimer, the term of this patent is extended or adjusted under 35 U.S.C. 154(b) by 0 days.

(21) Appl. No.: 12/273,281

(22) Filed: Nov. 18, 2008

(65) Prior Publication Data

US 2009/0075065 A1 Mar. 19, 2009

Related U.S. Application Data

(62) Division of application No. 10/898,045, filed on Jul. 22, 2004.

(60) Provisional application No. 60/489,161, filed on Jul. 22, 2003.

(51) Int. Cl.
*B41M 5/00* (2006.01)
*B44C 1/17* (2006.01)
*B32B 7/00* (2006.01)

(52) U.S. Cl. ..................... 428/195.1; 428/206; 428/325

(58) Field of Classification Search .............. 428/195.1, 428/206, 325
See application file for complete search history.

(56) References Cited

U.S. PATENT DOCUMENTS 4,241,142 A 12/1980 Kaliski et al.
4,751,111 A 6/1988 Lee et al.
5,283,129 A 2/1994 Renk et al.
5,302,437 A 4/1994 Idei et al.
5,922,457 A 7/1999 Yanagisawa et al.
6,254,725 B1 7/2001 Lau et al.
6,547,929 B2 4/2003 Bobsein et al.
6,613,419 B2 9/2003 Ohbayashi et al.

(Continued)

FOREIGN PATENT DOCUMENTS

EP 0842992 5/2003

(Continued)

OTHER PUBLICATIONS

Characteristics of Parker Print-Surf roughness as compared with Bekk smoothness; Enomae, T. and Onabe, F.; Paper Science Laboratory; The University of Tokyo, Japan.

*Primary Examiner*—Betelhem Shewareged
(74) *Attorney, Agent, or Firm*—Greer, Burns & Crain, Ltd.

(57) ABSTRACT

A method of producing the low glare, high print gloss paper of the invention comprises the steps of providing a paper substrate, coating the substrate with an aqueous coating composition having, as a dry parts by weight per 100 parts of pigment, 50-90 parts coarse delaminated clay pigment having a particle size of 8-12 microns and 10-20 parts calcium carbonate having a particle size of between 0.7 and 1.1 microns, drying the coating; and supercalendering the coated substrate with at least two passes per side with rolls having a surface roughness of 90-130 Ra. The step of supercalendering imparts a Parker Print-Surf roughness of 1.7-2.2 microns and a sheet gloss of about 25-30. Four color printing produces a print gloss of 65-70 and a delta gloss of at least 38.

7 Claims, 2 Drawing Sheets

U.S. PATENT DOCUMENTS

| | | | |
|---|---|---|---|
| 6,696,697 | B2 | 2/2004 | Enomoto |
| 6,808,258 | B2 | 10/2004 | Kaga et al. |
| 6,886,394 | B1 | 5/2005 | Kume |
| 6,983,694 | B2 | 1/2006 | Vermeersch et al. |
| 7,229,167 | B2 | 6/2007 | Miyamoto et al. |
| 2002/0014318 | A1 | 2/2002 | Bobsein et al. |
| 2002/0096277 | A1 | 7/2002 | Lau et al. |
| 2003/0059546 | A1 | 3/2003 | Johnson |
| 2003/0178165 | A1 | 9/2003 | Bobsein et al. |
| 2004/0146726 | A1 | 7/2004 | Heckes et al. |
| 2004/0208999 | A1 | 10/2004 | Wang et al. |
| 2005/0191441 | A1 | 9/2005 | Yamamoto et al. |

FOREIGN PATENT DOCUMENTS

| | | |
|---|---|---|
| JP | 60239596 | 11/1985 |
| JP | 4119192 | 4/1992 |
| JP | 07119086 | 9/1993 |
| JP | 5279984 | 10/1993 |
| WO | 03000993 | 6/2002 |
| WO | WO 02/072359 A1 | 9/2002 |
| WO | 02078978 | 10/2002 |

LOW GLARE, HIGH PRINT GLOSS PRINTING PAPER

CROSS-REFERENCE

This application is a division of co-pending U.S. application Ser. No. 10/898,045 filed Jul. 22, 2004, which claims the benefits of U.S. Provisional Application No. 60/489,161, filed Jul. 22, 2003.

FIELD OF THE INVENTION

This invention relates to printing papers and methods for making the same, and in particular to low glare and high print gloss printing papers and methods for making the same.

BACKGROUND OF THE INVENTION

There is market demand for papers having comparatively low sheet gloss with high print gloss. Lower sheet gloss provides easy readability of printed text in high glare situations such as those encountered on air planes and with bed side lamps. High print gloss is desirable for effective advertising. In papers with high delta gloss (difference between paper sheet and printed gloss), the printed images appear to jump out of the page attracting more "looks" from the readers thus enhancing the value for the advertisers and publishers.

It is well known that print gloss may be enhanced by improving the smoothness of the sheet. Use of clay pigments and calendering improves sheet smoothness and gloss. However, increases in print gloss typically also result in increases in sheet gloss, with little or no change in delta gloss. Similarly, efforts to reduce sheet gloss, to provide a low glare paper, result in corresponding decreases in print gloss, with little or no change in delta gloss.

Various proposals have been made to provide a paper with low sheet gloss, and high print gloss. See, U.S. Pat. No. 4,751,111 to Lee et al.; U.S. Pat. No. 5,283,129 to Renk et al.; U.S. Pat. No. 5,922,457 to Yanagisawa; and U.S. Pat. No. 6,547,929 to Bobsein, et al, which are hereby incorporated by reference. However, demand exists for low glare papers with increased delta gloss.

SUMMARY OF THE INVENTION

The coating formulation and subsequent finishing operations of the invention yield lower paper gloss for easy readability of printed text in high glare situations while maintaining high print gloss for effective advertising. Exceptional delta gloss is achieved.

A most basic embodiment of the product of the invention is a low glare, high print gloss coated paper comprising a substrate, a coating on said substrate, the coating having at least one binder and plural pigments, 50-90 parts per 100 parts dry weigh of the pigments comprising coarse delaminated clay. The surface is mechanically treated to have a Parker Print-Surf roughness no greater than about 2.2, a sheet gloss level no greater than about 30, and an ink tack rate no greater than about 0.04. When 4-color printed the sheet has a print gloss of at least about 65 and a delta gloss of at least about 38.

The coating more preferably comprises in units of dry parts by weight per 100 parts of pigments, 50-90 parts delaminated clay having an average particle size of 8-12 microns, 10-20 parts calcium carbonate having an average particle size of 0.7-1.1 microns, 5-12 parts starch, and 5-12 parts latex.

A method of producing the low glare, high print gloss paper of the invention comprises the steps of providing a paper substrate, coating the substrate with an aqueous coating composition having, as a dry parts by weight per 100 parts of pigment, 50-90 parts coarse delaminated clay pigment having a particle size of 8-12 microns and 10-20 parts calcium carbonate having a particle size of between 0.7 and 1.1 microns, drying the coating; and supercalendering the coated substrate with at least two passes per side with rolls having a surface roughness of 90-130 Ra. The step of supercalendering imparts a Parker Print-Surf roughness of about 1.7-2.2 and a sheet gloss of about 25-30. Four color printing produces a print gloss of 65-70 and a delta gloss of at least 38.

DETAILED DESCRIPTION OF A PREFERRED EMBODIMENT

Figure 1A:
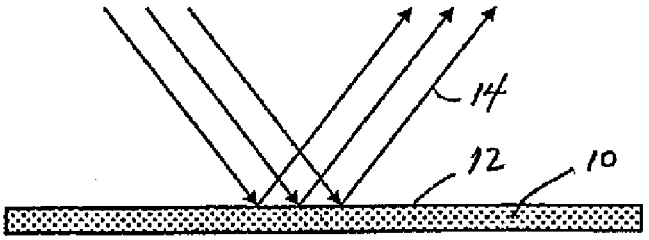
FIG. 1A is a schematic depiction of specular light reflection on a standard gloss paper.
Figure 1B:
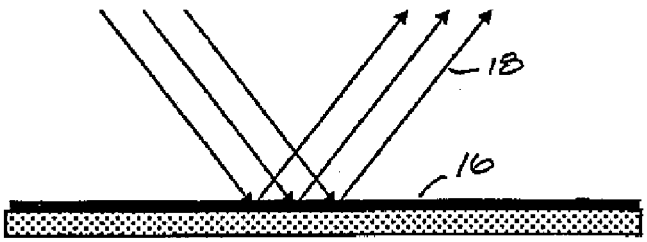
FIG. 1B is a schematic depiction of specular light reflection on a gloss print surface.

Referring now to the drawings, it is known that standard grades of paper 10 made with a smooth surface 12 provide a uniform specular reflection of light, shown by arrows 14, that results in high sheet gloss as shown in FIG. 1A. Similarly, a smooth paper surface facilitates a smooth ink surface 16, and high print gloss, as shown by arrows 18 in FIG. 1B.

Figure 2A:
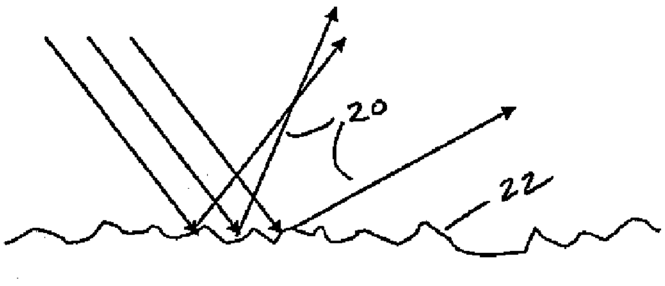
FIG. 2A is a schematic depiction of specular light reflection on a low gloss paper.
Figure 2B:
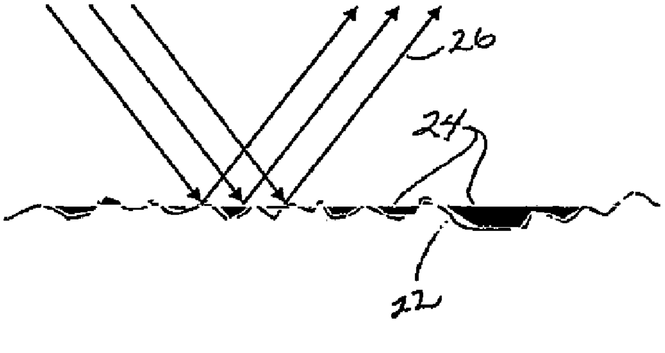
FIG. 2B is a schematic depiction of specular light reflection on a high print gloss surface on a low gloss paper.

It has been discovered that low paper gloss and high print gloss are achieved by manufacturing the paper surface with micro roughness and macro smoothness. FIG. 2A illustrates specular refection of light, shown by arrows 20, from enlarged portion of a paper surface 22 with micro roughness. Light diffuses due to micro-roughness giving low glare appearance. FIG. 2B shows that macro smoothness of surface 22 allows ink 24 to fill in most of the rough areas, providing a smooth ink surface after printing. The smooth ink surface provides uniform light reflection as shown by arrows 26, and thus high print gloss.

In accordance with the present invention, micro roughness and macro smoothness of a paper surface is achieved by providing a coating formulation designed to provide macro smoothness, and subsequent finishing operations that improve macro smoothness and impart micro roughness.

A coating composition of the invention comprises one or more pigments, one or more binders and optional additives. Coarse delaminated clay offers large platy pigment particles to cover the macro roughness of the cellulose fibers. The delaminated clay has an average particle size of 8-12 microns, most preferably about 9.5 micron (measured on Horiba particle size analyzer). A suitable delaminated clay is Kaoroto SP™ manufactured by Thiele Kaolin Corp.

Preferably, the coating composition includes coarse ground calcium carbonate, which helps the rheology of the coating formulation, improves pigment spacing and also reduces the paper gloss due to its coarseness. Coarse precipitated calcium carbonate could be used in place of ground calcium carbonate. The calcium carbonate has an average particle size of 0.7 to 1.1 microns, preferably about 0.9 microns (measured on Horiba particle size analyzer). A suitable source for coarse calcium carbonate is Omyapaque™ form Omya Inc. In place of coarse carbonate, other clay pigments may be used that inhibit gloss development while filling the voids created by coarse delaminated clay for macro smoothness.

Other pigments such as calcined clay, talc, $TiO_2$ and plastic pigments could be used to achieve brightness and opacity targets as needed.

One or more binders are required to bind the pigments to the surface of the substrate. Natural and synthetic binders can be used to impart sufficient surface strength while maintaining desired levels of opacity, brightness and surface smoothness. Suitable binders may include, but are not limited to, starch, protein and latex. Above about 10 parts of starch per 100 parts of pigment should be used the high level of starch can adversely affect print gloss.

Other additives such as lubricants may be added to the composition, but are not strictly required.

The operative ranges, preferred ranges and most preferred quantities of coating composition constituents are shown in the below table. The numeric data is expressed in units of parts by weight per 100 parts pigment.

| | Most preferred | Preferred range | Operative Range |
|---|---|---|---|
| Coarse delaminated clay | 70 | 55 to 75 | 50 to 90 |
| Coarse carbonate | 20 | 15 to 25 | 30 to 50 |
| Calcined clay | 10 | 5 to 15 | 0 to 25 |
| Starch | 9 | 7 to 10 | 5 to 12 |
| Latex | 9 | 7 to 10 | 5 to 12 |
| Lubricant | 1 | 0.5 to 1.5 | 0 to 2 |

The coating composition can be applied to a wide variety of substrates. The specific composition of the substrate is not important. However, in papers made with an acidic paper furnish, it is preferably to use no more than 20 parts calcium carbonate. The coating composition may be applied at a wide range of coat weights. Preferably the coat weight is 3 or more pounds per 3,300 square foot ream on conventional paper substrates, and more preferably 4-8 pounds per 3,300 square foot ream.

The coated paper is preferably supercalendered to improve macro smoothness of the sheet and to impart micro roughness. Although supercalendering is preferred, it may be possible to impart micro roughness to the sheet by other means.

Figure 3:
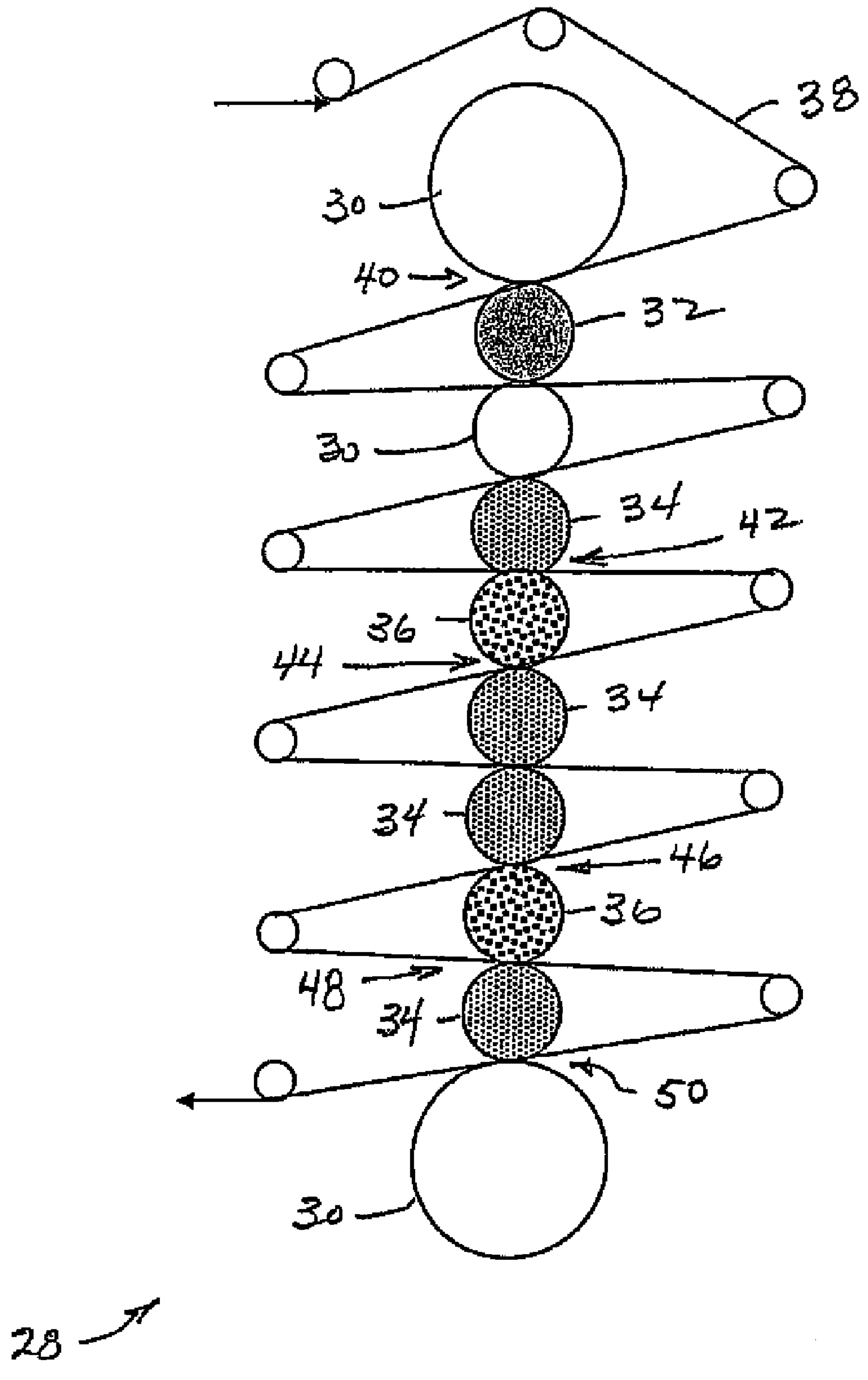
FIG. 3 is a schematic depiction of a supercalender used in practicing the method of the invention.

Referring to FIG. 3, one embodiment of a calender stack 28 comprises smooth steel rolls 30, cotton rolls 32, synthetic rolls 34 and rough surface rolls 36. The paper web 38 is run to provide one cotton nip and two rough roll nips per side. The sheet 38 first goes through nip 40 between the cotton roll and steel roll developing good smoothness initially. In the fourth 42 and fifth 44 nips, the underside of the sheet comes in contact with rough surface rolls to develop micro-roughness, which provides low paper gloss. In the seventh 46 and eighth 48 nips, the top side of the paper is finished with rough rolls. The final nip 50 helps to even out the imperfections if any, from the rough rolls.

The rough surface rolls 36 preferably have a surface roughness of 90 to 130 Ra. The rolls may be made in any manner known in the art, e.g., by sand blasting or spraying steel rolls with liquid metal to achieve the required roughness. Steel rolls with a tungsten carbide coating have been successfully used.

The temperature of the calender stack can be varied between ambient temperature and 180 F. depending on the paper gloss required. For low levels of gloss, ambient temperature is preferred.

Macro smoothness is measured using TAPPI Test Method T 555 "Roughness of paper and paperboard" (Parker Print-Surf method). Paper made in accordance with the invention has a Parker Print-Surf roughness of 1.7-2.2 microns before printing.

Print gloss is affected by the rate at which ink develops its tack. Generally, papers that cause faster ink tack have lower print gloss due to ink split pattern. A slower rate of ink tack allows ink to fill the microscopic hills and valleys on the surface of the paper, level the ink surface, and thereby provide a smooth printed surface with increased print gloss. Ink tack rate can be improved by slowing the rate at which ink solvent is absorbed into the sheet. In the present invention the coating of the invention comprised of coarse delaminated clay in combination with other pigments such as calcium carbonate, creates a tortuous void structure that slows solvent absorption, improves ink hold out, and desirably reduces the ink tack rate. A comparatively high starch content, e.g., about 9 parts starch per 100 parts of pigment, also contributes to slow ink solvent absorption.

Ink tack rate can be quantified in units of force over time by known test methods and apparatus, e.g., Prufbau Deltack laboratory equipment. Papers made in accordance with the invention have a tack rate in the range of 0.02-0.04 N/sec. using a common printing ink (Flint Ink FXK 268, Aeroweb Process Black) and Prufbau Deltack equipment. This rate is exceptionally slow for a low gloss paper and thus provides excellent print gloss.

Papers made in accordance with the invention have sheet gloss in the range of 25-30, print gloss of 65-70, and delta gloss equal to or more than 38. As used herein, gloss levels are determined using TAPPI Test Method T 480. AF&PA categorizes the grades of gloss as:

45 and over: Gloss Grades 25-35: Dull Grades 0-20: Matt Grades

EXAMPLE 1

A low glossing coating formulation was made, coated to a paper substrate, and subsequently supercalendered using specially treated tungsten carbide rolls. The coating formulation comprise of the following ingredients:

| | Parts by Weight |
|---|---|
| Coarse delaminated clay | 70 |
| Coarse carbonate | 20 |
| Calcined clay | 10 |
| Starch | 9 |
| Latex | 9 |
| Lubricant | 1 |

The coating was applied using short dwell type applicator at a coat weight of 4 pounds per side. After application, the coated samples were finished using a calender stack consisting of tungsten carbide coated rolls at surface roughness of 90 to 130 Ra. The paper is finished through multiple nips as shown in FIG. 2.

Samples of the resulting paper were printed on a conventional offset printing press and tested for gloss. Samples of a standard gloss paper were also tested for comparative purposes. The results were as follows:

| | Standard Gloss Paper | Example 1 Sample |
|---|---|---|
| Sheet Gloss | 37 | 27 |
| Roughness | 2.18 μ | 2.42 μ |
| After Printing | | |
| (Parker Print-Surf) | | |
| 1-Color Print Gloss | 57 | 50 |
| 1-Color Delta Gloss | 20 | 23 |
| 4-Color Print Gloss | 71 | 67 |
| 4-Color Delta Gloss | 34 | 40 |

EXAMPLE 2

Comparative laboratory tests were conducted on a standard base paper coated with a preferred coating composition of the invention (sample 1255) and four variations from the preferred coating composition. All test samples were subject to the same laboratory calendering to simulate rough roll calendering as described above. The test data is set forth in table below shows improved delta gloss for the preferred composition (sample 1255) with a pigment comprised of 80 parts of coarse delaminated clay with a particle size of 8.6 microns and 20 parts coarse calcium carbonate.

| Ctg ID | 1249 | 1252 | 1255 | 1258 | 1260 |
|---|---|---|---|---|---|
| #2 Clay | | 80 | | | 80 |
| Delaminated Clay1 @ 4.0 microns | 90 | | | | |
| Coarse Delaminated Clay1 @ Size: 8.6 microns | | | 80 | | |
| Coarse Delaminated Clay2 @ 6.2 microns | | | | 80 | |
| Calcined Clay | 10 | | | | |
| Coarse Carbonate (Omyapaque) | | 20 | 20 | 20 | 20 |
| Latex 1 | 9 | 9 | 9 | 9 | |
| Latex 2 | | | | | 16 |
| Starch | 9 | 9 | 9 | 9 | 9 |
| Lubricant | 1 | 1 | 1 | 1 | 1 |
| **Sample ID** | **1251** | **1254** | **1257** | **1259** | **1261** |
| Sheet Gloss | 31.3 | 22.9 | 25.8 | 22.2 | 23.0 |
| 1-Color Gloss | 51.8 | 42.2 | 47.7 | 41.1 | 40.5 |
| 1-Color Delta Gloss | 20.5 | 19.3 | 21.9 | 18.9 | 17.5 |
| 4-Color Gloss | 67.5 | 59.5 | 65.3 | 59.3 | 57.0 |
| 4-Color Delta Gloss | 36.2 | 36.6 | 39.5 | 37.1 | 34.0 |

While specific embodiments and examples of the products and methods of invention have been shown and described, it will be appreciated by those skilled in the art that changes and modifications may be made thereto without departing from the invention in its broader aspects and as set forth in the following claims.

What is claimed is:

1. A low glare, high print gloss coated paper comprising:

a substrate;

a coating on said substrate, said coating comprising plural pigments, 50-90 parts per 100 parts dry weigh of said pigments comprising coarse delaminated clay, and between 5 and 12 parts starch and between 5 and 12 parts latex per 100 parts dry weigh of said pigments; and a surface of said coating having a Parker Print-Surf roughness no greater than about 2.2 microns, a sheet gloss level no greater than about 30, and an ink tack rate in the range of about 0.02 N/Sec. to about 0.04 N/Sec.

2. A low glare, high print gloss coated paper as in claim 1, wherein said surface coating when 4-color printed has a delta gloss of at least about 38.

3. A low glare, high print gloss coated paper as in claim 1, wherein said surface coating when 4-color printed has a print gloss of at least about 65.

4. A low glare, high print gloss coated paper as in claim 1, wherein said coating comprises 10-20 parts coarse calcium carbonate.

5. A low glare, high print gloss coated paper, comprising a cellulous substrate;

a coating on said substrate comprising, as a dry parts by weight per 100 parts of pigments, 50-90 parts delaminated clay having an average particle size of 8-12 microns, 10-20 parts calcium carbonate having an average particle size of 0.7-1.1 microns, 7-10 parts starch, and 7-10 parts latex;

the surface of said coating being supercalendered with rough surfaced rolls to have a sheet gloss level of 25-30; and said paper having when printed a 4-color delta gloss of at least 38.

6. A low glare, high print gloss coated paper as in claim 5, said paper having a Parker Print-Surf roughness of 1.7-2.2 microns.

7. A low glare, high print gloss coated paper, comprising a cellulous substrate;

a coating on said substrate comprising, as a dry parts by weight per 100 parts of pigments, 50-90 parts coarse delaminated clay, 10-20 parts coarse calcium carbonate, 6-12 parts starch, and 6-12 parts latex;

the surface of said coating being mechanically treated to have a Parker Print-Surf roughness of 1.7-2.2 microns and a sheet gloss level less than 30; and said paper having when printed a 4-color print gloss of at least about 65.

* * * * *